United States Patent
Sebastian et al.

(10) Patent No.: US 9,430,846 B2
(45) Date of Patent: Aug. 30, 2016

(54) METHOD OF TRACKING OBJECTS USING HYPERSPECTRAL IMAGERY

(71) Applicant: GE Aviation Systems LLC, Grand Rapids, MI (US)

(72) Inventors: Thomas Baby Sebastian, Chatham, NJ (US); Eric Daniel Buehler, Grand Rapids, MI (US); Stefano Angelo Mario Lassini, Lowell, MI (US); Benjamin Thomas Occhipinti, Grand Rapids, MI (US); Konrad Robert Kuczynski, Grand Rapids, MI (US); Richard Shawn Kelly, Grand Rapids, MI (US); Matthew James Schafer, Kentwood, MI (US); Rebecca Jeanne Smith, Santa Clara, CA (US)

(73) Assignee: GE AVIATION SYSTEMS LLC, Grand Rapids, MI (US)

(*) Notice: Subject to any disclaimer, the term of this patent is extended or adjusted under 35 U.S.C. 154(b) by 343 days.

(21) Appl. No.: 13/866,086

(22) Filed: Apr. 19, 2013

(65) Prior Publication Data

US 2014/0314272 A1   Oct. 23, 2014

(51) Int. Cl.
| | |
|---|---|
| G06F 9/00 | (2006.01) |
| G06K 9/34 | (2006.01) |
| G06K 9/62 | (2006.01) |
| G06K 9/64 | (2006.01) |
| G06T 7/20 | (2006.01) |

(52) U.S. Cl.
CPC ............. *G06T 7/20* (2013.01); *G06T 7/2053* (2013.01); *G06T 2207/10016* (2013.01); *G06T 2207/10036* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 5,424,543 A | 6/1995 | Dombrowski et al. | |
| 5,479,015 A | 12/1995 | Rudman et al. | |
| 5,568,186 A | 10/1996 | Althouse | |

(Continued)

FOREIGN PATENT DOCUMENTS

| | | |
|---|---|---|
| CN | 102393913 A | 3/2012 |
| EP | 2221577 A2 | 8/2010 |

(Continued)

OTHER PUBLICATIONS

Smith, R.B. (Jul. 14, 2006), Introduction to hyperspectral imaging with TMIPS, MicroImages Tutorial Web site, pp. 1-24.*

(Continued)

*Primary Examiner* — Matthew Bella
*Assistant Examiner* — Jose M Torres
(74) *Attorney, Agent, or Firm* — GE Global Patent Operation; William S. Munnerlyn

(57) ABSTRACT

A method of tracking motion of at least one object of a group of moving objects using hyperspectral imaging includes, among other things, obtaining a series of hyperspectral image frames; comparing each frame in the series to a template to determine changes in the image between frames; identifying a group of pixels in each frame associated with the changes; identifying changes as motion of the moving objects; correlating the pixel groups frame to frame to spatially determine at least one parameter of the motion of the objects; and correlating the pixel groups with a spectral reflectance profile associated with the at least one object wherein the track of the at least one object is distinguishable from the tracks of other moving objects.

12 Claims, 2 Drawing Sheets

(56) References Cited

U.S. PATENT DOCUMENTS

| | | |
|---|---|---|
| 5,790,188 A | 8/1998 | Sun |
| 5,986,758 A | 11/1999 | Lyons et al. |
| 6,160,902 A | 12/2000 | Dickson et al. |
| 6,192,322 B1 | 2/2001 | Rafanelli et al. |
| 6,269,182 B1 | 7/2001 | Ishii |
| 6,466,961 B1 | 10/2002 | Miller |
| 6,819,778 B2 | 11/2004 | Kamei |
| 7,135,682 B1 | 11/2006 | Lucey |
| 7,136,525 B1 | 11/2006 | Toyama et al. |
| 7,212,652 B1 | 5/2007 | Graham et al. |
| 7,415,164 B2 | 8/2008 | Wren et al. |
| 7,499,836 B1 | 3/2009 | Mooney |
| 7,501,636 B1 | 3/2009 | Son et al. |
| 7,505,608 B2 | 3/2009 | Portigal et al. |
| 2003/0123056 A1 | 7/2003 | Barnes et al. |
| 2004/0080829 A1 | 4/2004 | Schultz |
| 2006/0158647 A1 | 7/2006 | Yao |
| 2007/0146700 A1 | 6/2007 | Kowarz et al. |
| 2007/0146710 A1 | 6/2007 | Kowarz et al. |
| 2007/0176080 A1 | 8/2007 | Schofield et al. |
| 2008/0046217 A1* | 2/2008 | Polonskiy ............... G01J 3/28 702/179 |
| 2008/0049228 A1 | 2/2008 | Chan |
| 2008/0088852 A1 | 4/2008 | Rogers et al. |
| 2008/0123097 A1 | 5/2008 | Muhammed et al. |
| 2010/0166330 A1 | 7/2010 | Thyagarajan et al. |
| 2010/0322480 A1* | 12/2010 | Banerjee ............ G06K 9/2018 382/103 |
| 2011/0112407 A1 | 5/2011 | Wood et al. |
| 2011/0228116 A1 | 9/2011 | Margalith |
| 2012/0045096 A1* | 2/2012 | Naito ................. G06K 9/00771 382/103 |
| 2012/0062697 A1 | 3/2012 | Treado et al. |
| 2012/0140981 A1* | 6/2012 | Berkman et al. ............ 382/103 |
| 2012/0154579 A1 | 6/2012 | Hampapur et al. |
| 2013/0034266 A1 | 2/2013 | Shamir et al. |
| 2013/0076913 A1* | 3/2013 | Xu .................... H04N 5/23206 348/169 |
| 2013/0208944 A1* | 8/2013 | Rosario ........................ 382/103 |

FOREIGN PATENT DOCUMENTS

| | | |
|---|---|---|
| EP | 2698740 A2 | 2/2014 |
| EP | 2793191 A2 | 10/2014 |
| JP | 11039589 A | 2/1999 |
| JP | 2001285695 A | 10/2001 |
| JP | 2008236437 A | 10/2008 |
| WO | 9735166 A1 | 9/1997 |
| WO | 9902950 A1 | 1/1999 |
| WO | 03106917 A2 | 12/2003 |
| WO | 2004074767 A1 | 9/2004 |
| WO | 2009128065 A1 | 10/2009 |
| WO | 2011107987 A1 | 9/2011 |

OTHER PUBLICATIONS

Blackburn et al., "Feature Aided Tracking with Hyperspectral Imagery", Proc. SPIE 6699, Signal and Data Processing of Small Targets 2007, 66990S (Sep. 25, 2007); doi:10.1117/12.734937.*

Banerjee et al., "Hyperspectral Video for Illumination-Invariatn Tracking", in Hyperspectral Image and Signal Processing: Evolution in Remote Sensing, 2009. WHISPERS '09. First Workshop on , vol., no., pp. 1-4, Aug. 26-28, 2009 doi: 10.1109/WHISPERS.2009.5289103.*

Wang et al., "Bio-Inspired Adaptive Hyperspectral Imaging for Real-Time Target Tracking", in Sensors Journal, IEEE , vol. 10, No. 3, pp. 647-654, Mar. 2010 doi: 10.1109/JSEN.2009.2038657.*

International Search Report issued in connection with corresponding GB Application No. GB1406715.1 on Oct. 31, 2014.

Ono et al., "Image Acquisition via Spacecraft and Explorers and Satellite Remote Sensing", Journal of the Institute of Image Information and Television Engineers, vol. No. 66, Issue No. 6, Jun. 1, 2012.

Unofficial English Translation of Japanese Office Action issued in connection with corresponding JP Application No. 2014085085 on Apr. 14, 2015.

Aminov et al. "Spatial and Temporal Point Tracking in Real Hyperspectral Images" EURASIP Journal on Advances in Signal Processing, pp. 1-25, Dec., 2011.

German Office Action issued in connection with corresponding DE Application No. 1020141105567.5 on Oct. 29, 2015.

unofficial translation of CN Office Action issued on May 26, 2016 in relation to corresponding CN application 201410155488.5.

* cited by examiner

METHOD OF TRACKING OBJECTS USING HYPERSPECTRAL IMAGERY

BACKGROUND OF THE INVENTION

Hyperspectral cameras are capable of capturing hyperspectral image frames, or datacubes at video frame rates. These cameras acquire high spatial and spectral resolution imagery. In combination with techniques relating to computer vision and spectral analysis, operators of hyperspectral cameras have engaged in surveillance applications relating to detection, tracking and identification of imaged objects.

BRIEF DESCRIPTION OF THE INVENTION

One aspect of the invention relates to a method of tracking motion of at least one object of a group of moving objects using hyperspectral imaging. The method includes obtaining a series of hyperspectral image frames; comparing each frame in the series to a template to determine changes in the image between frames; identifying a group of pixels in each frame associated with the changes; identifying changes as motion of the moving objects; correlating the pixel groups frame to frame to spatially determine at least one parameter of the motion of the objects; and correlating the pixel groups with a spectral reflectance profile associated with the at least one object wherein the track of the at least one object is distinguishable from the tracks of other moving objects.

DESCRIPTION OF EMBODIMENTS OF THE INVENTION

Figure 1:
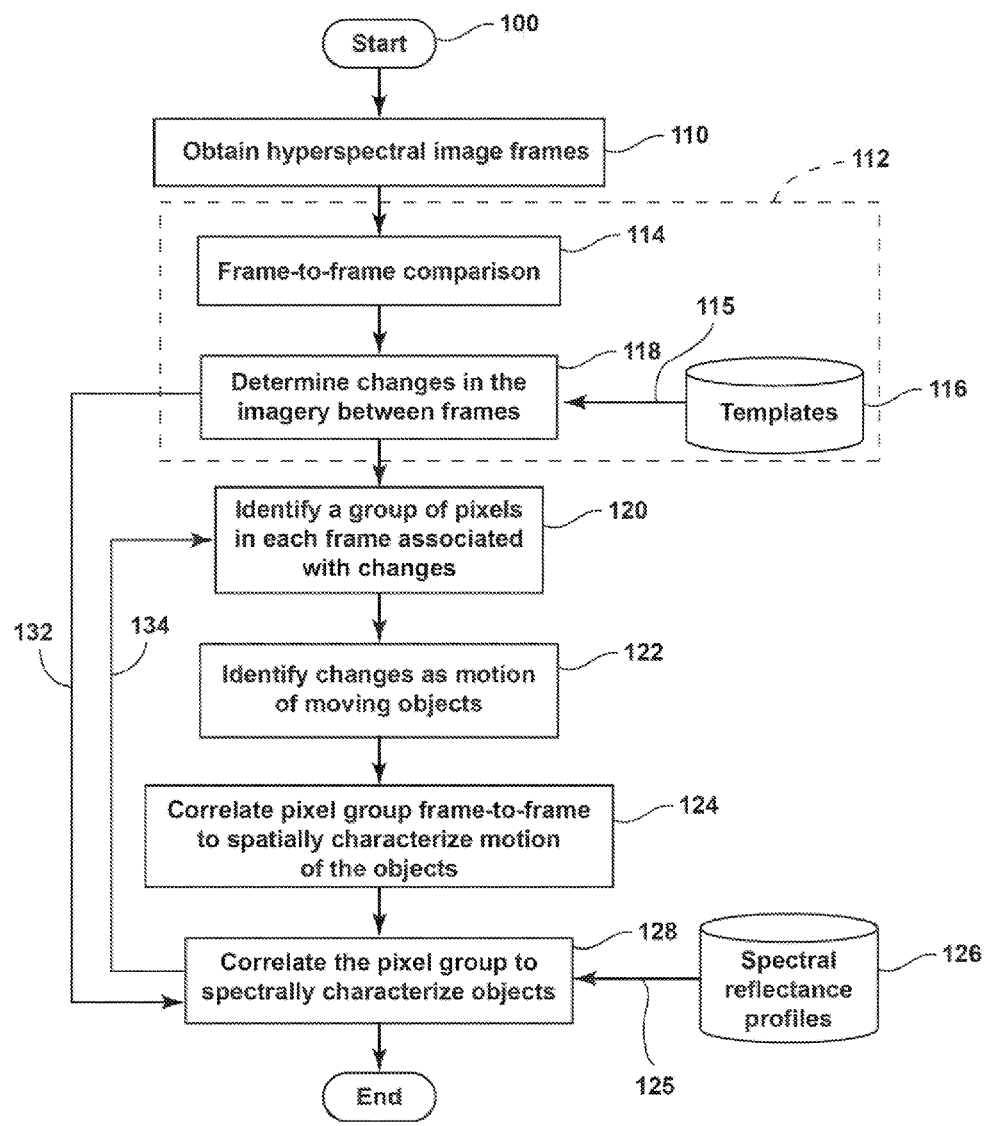
FIG. 1 is a flowchart showing a method of tracking motion of at least one object of a group of moving objects using hyperspectral imaging according to an embodiment of the invention.

In the background and the following description, for the purpose of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include increasing the utility and performance of remote imaging systems for object detection and tracking The method will reduce errors in traditional spatial tracking due to occlusions, blob merging, image frame dropping, object intersection and other issues associated with frame differencing techniques that use grey scale image contrast-based detection methods. As well, the method improves on autonomous object tracking systems by providing basic auto-nomination, reacquisition, and target search capabilities.

FIG. 1 is a flowchart showing a method of tracking motion of one or more objects in a group of objects according to an embodiment of the invention that uses a fusion of spectral and spatial information contained in hyperspectral imagery. Initially, at step 100, during the course of operating a platform equipped with a hyperspectral camera, it may be necessary to process imagery for the purposes of detecting, tracking and identifying objects.

At step 110, the hyperspectral camera may obtain a series of hyperspectral image frames. A processor onboard the platform may perform the processing of the frames or may direct the transmission of the imagery to a remote location for processing by a second processor or processing system (collectively termed "a processor"). Initially, the processor may determine changes in the hyperspectral image frames by spatial analysis techniques. As shown in FIG. 1, the processor may perform at 112 a sequence of steps 114, 118 on the hyperspectral image frames with a goal to determine changes in the imagery by comparison to a template 115. The processor may first conduct a frame-to-frame comparison at step 114 of the imagery using conventional spatial analysis or image processing techniques. By performing a direct comparison of the spatial properties of the image frames, the processor may determine characteristics of the imagery relating to calibration and alignment of the imagery or may determine characteristics of the imaged scene relating to imaged objects in motion. With respect to calibration and alignment, the processor may perform a series of well-known image processing techniques that may relate but not be limited to noise filtering, corner detection, image registration, homography and frame-to-frame alignment. The processor may employ other image processing techniques relating to the detection of objects in the image frames based on image properties such as contrast, resolution and intensity.

Based in part upon the frame-to-frame comparison at step 114, the processor may determine changes in the imagery between frames at step 118. The processor may compare the image frames and the characteristics identified as differences between the frames to reference target templates 115 of known targets that may be stored in a template database 116. The reference target templates 115 may be previously established descriptors that represent the spatial characteristics of a hyperspectral image of a real-world object of interest. For example, a template 115 may include a set of pixels that demonstrate the expected shape of an object as imaged by the system. Alternatively, a template 115 may consist of a set of vectors stored to represent a particular decomposition of the expected shape of an object, for example, as the output of a Principal Component Analysis or a wavelet transform. Regardless of the particular format of the spatial descriptor in the templates 115, the processor may perform a correlation or matching operation at step 118 to exploit prior knowledge pertaining to objects encoded in a template 115 to further determine changes in the image frames.

The processor may output from step 118 detected changes in the image frames derived from both frame-to-frame comparison at step 114 and a template 115. With a goal to identify potential objects to be tracked the processor outputs at step 118 groups of pixels in the image frames. In one embodiment of the invention, the processor may direct the output to a step 120 to identify a group of pixels in each frame associated with the detected changes. In another embodiment of the invention, the processor may direct the output via control flow 132 to a step 128 to correlate the groups of pixels to spectrally characterize the objects.

At step 120, the processor may identify a group of pixels in each frame associated with the detected changes output at step 118. The processor may perform a series of functions and calculations on the individual frames to join, merge and/or cull pixels in each frame into groups of pixels associated with detected changes in the image frames derived from both the frame-to-frame comparison at step 114 and the templates 115. Then, at step 122, the processor may identify motion of moving objects in the series of image frames based upon the detected changes in the image frames and the group of pixels in each frame associated with the detected changes. Upon detection and identification of moving objects in the series hyperspectral image frames, the processor may further correlate the pixel groups across the frames to spatially characterize the motion of the identified, detected objects at step 124. The processor may parameterize the motion based upon known image processing and computer vision techniques to determine a characteristic such as velocity or acceleration. The parameterization of the motion may then be used as additional information for subsequent tracking efforts. For example, the processor of a tracking system with prior information detailing the velocity of an object being tracked may apply additional transformations when processing the frame-to-frame comparisons and spatial template matching to account for the expected location of the object in the hyperspectral image frames.

At step 128, the processor may determine the correlation of the pixel groups to a spectral reflectance profile 125 stored in a spectral reflectance profile database 126. The spectral reflectance profile 125 may be determined a priori and may describe the spectral characteristics of a hyperspectral image of a real-world object of interest. Further, the spectral reflectance profile 125 may be composed of many spectral reflectance signatures. Therefore, the spectral reflectance profile database 126 may describe both the spectral reflectance signatures of a real-world object of interest and the spatial relationships between them.

To correlate or match the pixel group to an object described in the spectral reflectance profile database 126, the processor may determine if the spatial distribution of the group of pixels for each signature is similar to the spatial distribution of signatures in a spectral reflectance profile 125. Because the spectral reflectance profile database 126 may have multiple profiles 125 relating to multiple objects, the processor correlating the pixel groups to a spectral reflectance profile 125 may employ a hyperspectral search algorithm to match the pixel group to a particular reflectance profile 125.

A number of hyperspectral search algorithms have been developed and used in the processing of hyperspectral imagery for the purpose of object detection. Typically built upon well-known statistical concepts, hyperspectral search algorithms exploit statistical characteristics of candidate objects in the imagery. For example, Mahalanobis distance is a statistical measure of similarity often applied to hyperspectral pixel signatures. Mahalanobis distance measures a signature's similarity by testing the signature against an average and standard deviation of a known class of signatures. Similarity measures may include elements of known spectral analysis detection techniques such as Spectral Angle Mapping (SAM), Spectral Information Distance (SID), Zero Mean Differential Area (ZMDA) or Bhattacharyya Distance. The processor may employ other similarity measures depending upon the implementation.

While the spectral reflectance profiles 125 may be preferably stored in and retrieved from the spectral reflectance profile database 126 as shown in FIG. 1, other sources of spectral reflectance profiles 125 for use as a reference may include the hyperspectral image frames themselves. For example, the processor may include additional processing capability whereby groups of pixels may be automatically determined to be images of objects of interest. Alternatively, an operator of a system collecting hyperspectral imagery may manually select groups of pixels on a display and identify the corresponding spectral reflectance signatures as a spectral reflectance profile 125 of an object of interest.

As described above, the processor may integrate the step 128 to correlate the pixel group to spectrally characterize objects in one of several places depending upon the implementation of the current invention. As shown in FIG. 1, the main control flow of the method demonstrates that the step 128 to correlate the pixel group to spectrally characterize objects may follow the step 124 to correlate the pixel group frame-to-frame to spatially characterize the motion of the objects. Additional control flows 132 and 134 demonstrate that the step 128 to correlate the pixel group to spectrally characterize objects may directly follow the step 118 to determine changes in the imagery between hyperspectral image frames. Depending upon the implementation, the step 128 may follow either step 118 or step 124 or may follow both steps 118 and 124.

In one embodiment of the invention, the processor only performs the step 128 of correlating the pixel group to spectrally characterize the object if the parameter of motion determined in step 124 is less than a predetermined threshold. For example, the processor may not spectrally characterize a detected object moving at a velocity greater than 5 m/s. By only spectrally characterizing objects that have slowed or stopped, the processor may efficiently process the imagery and maintain the track of objects typically difficult to track with spatial tracking methods. The additional step of spectral correlation may assist with track linking and track confirmation, resulting in the reduction of false positives and other tracking errors common to standard spatial tracking methods.

There are many scenarios where an object may be difficult to acquire or maintain track based on spatial tracking techniques. Such scenarios may include: a tracked object becomes occluded by another object; or a tracked object splits into multiple separate objects. Other scenarios exist and these should not be considered limiting.

Figure 2:
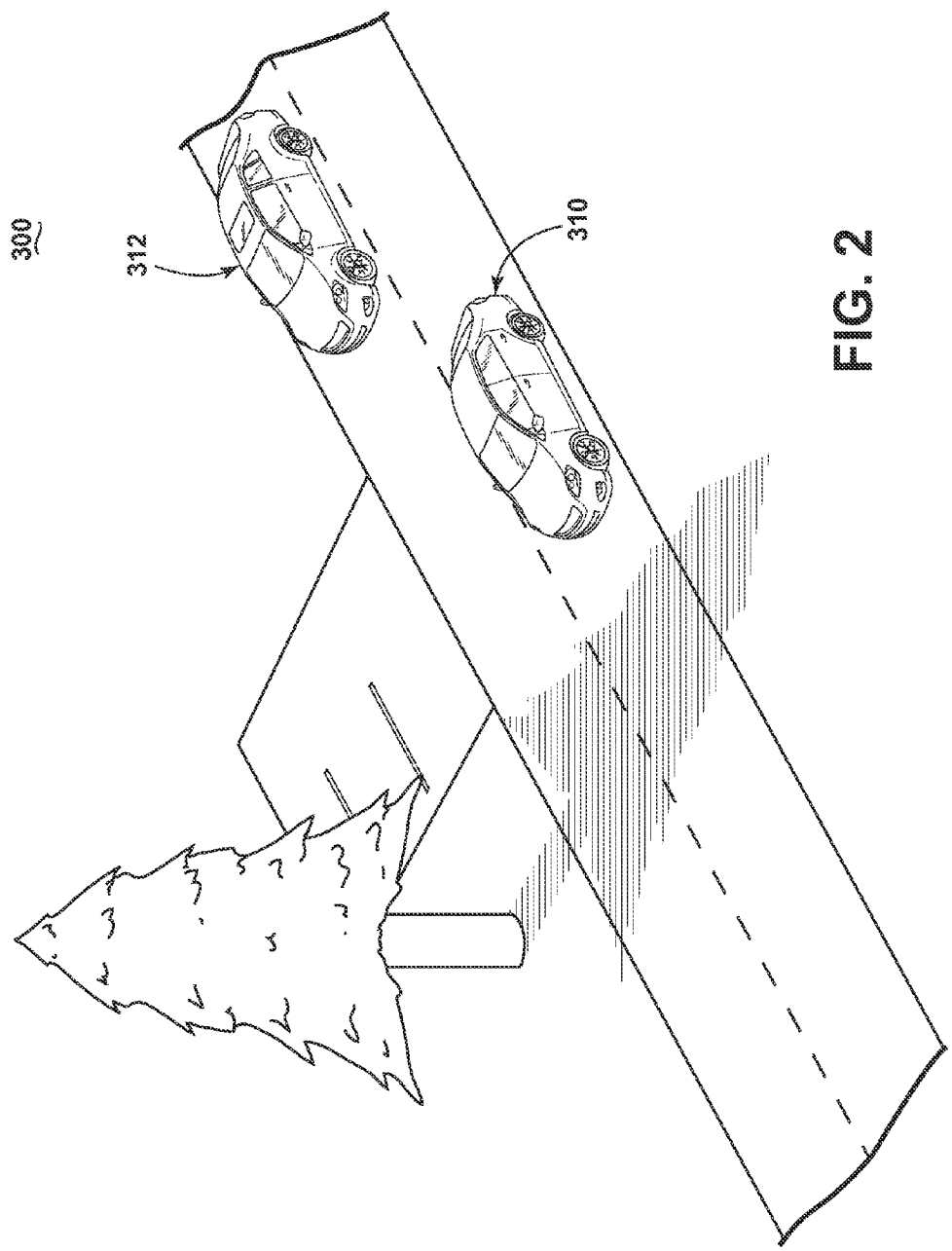
FIG. 2 shows a scenario where a hyperspectral imaging system has detected and tracked two objects according to an embodiment of the invention.

FIG. 2 demonstrates an example scenario at 300 where the method for tracking motion of an object among a group of moving objects with hyperspectral imagery according to an embodiment of the invention detects and tracks a vehicle 310 traveling at approximately the same velocity as a second vehicle 312 on the same road. The processor implementing the method in FIG. 1 processes a series of hyperspectral frames and tracks the two similar model vehicles. If, for example, the vehicles 310 and 312 are different colors, the spectral correlation provides a distinct difference between the two similarly shaped and moving vehicles. Assuming the two vehicles travel near one another at approximately the same velocity, a tracking system based purely on spatial analysis may be confused when the two vehicles 310, 312 go separate ways, for example, if vehicle 310 stops and vehicle 312 continues. However, the tracking system based on the method of FIG. 1. will continue tracking vehicle 310. Essentially, the fusion of the spatial tracking techniques with the spectral characterization of the pixel groups based on the spectral reflectance profile 125 allows for robust tracking of a moving object in the presence of confusers. Additionally, the added spectral information and processing allows for maintaining the track of vehicle 310 even when the vehicle 310 stops.

Were the vehicles 310, 312 to continue on the road, the tracking system may drop track of the vehicles if, for example, the vehicles were obscured from the view of the tracking system as they pass the tree shown in FIG. 2. But because the spectral reflectance profile 125 of an object is consistent over time, the track may be reacquired as the vehicle 310 emerges into the unoccluded field of view of the tracking system. Here, the spectral reflectance profile 125 allows for robust tracking of a moving object even when there are occlusions in coverage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of tracking motion of at least one object of a group of moving objects using hyperspectral imaging, comprising:
    obtaining a series of hyperspectral image frames;
    comparing frames in the series to a template to determine changes in the image between frames;
    identifying a group of pixels in the frames associated with the changes;
    identifying the changes as motion of the moving objects;
    correlating the pixel groups frame-to-frame to spatially determine at least one parameter of the motion of the objects; and
    correlating the pixel groups with a spectral reflectance profile associated with the at least one object, and distinguishably tracking, based on the spectral reflectance profile, the at least one object from the other moving objects.

2. The method of claim 1 wherein the correlating the pixel groups with the spectral reflectance profile is performed as the next step after the comparing.

3. The method of claim 1 wherein the correlating the pixel groups with a spectral reflectance profile is performed as the next step after the correlating the pixel groups frame-to-frame to spatially determine at least one parameter of the motion of the objects.

4. The method of claim 1 wherein the correlating the pixel groups with a spectral reflectance profile is performed as the next step after the comparing frames in the series to the template and as the next step after the correlating the pixel groups frame-to-frame to spatially determine at least one parameter of the motion of the object.

5. The method of claim 1 wherein correlating the pixel groups with a spectral reflectance profile, includes correlating the pixel groups with a spectral reflectance profile when the value of the at least one parameter of the motion of the objects is less than a predetermined threshold.

6. The method of claim 1 wherein the at least one parameter of the motion of the objects is velocity.

7. The method of claim 1 wherein the at least one parameter of the motion of the objects is acceleration.

8. The method of claim 1 wherein the spectral reflectance profile is stored in and retrieved from a database of spectral reflectance profiles.

9. The method of claim 1 wherein the spectral reflectance profile is derived from a group of pixels in the series of hyperspectral image frames.

10. A method of tracking motion of an object using hyperspectral imaging, comprising:
    acquiring a set of hyperspectral image frames;
    determining characteristics of the object by comparing a first frame in the set of hyperspectral image frames with a second frame in the set of hyperspectral image frames;
    determining changes in the imagery based on comparing the set of frames and characteristics to a set of templates;
    identifying a set of pixels in the set frames associated with the changes;
    determining at least one spatial parameter of the motion of the object based on correlating the set of pixels across the set of frames;
    correlating the set of pixels with a spectral reflectance profile; and
    tracking the object based at least in part on the spectral reflectance profile.

11. The method of claim 10, wherein the characteristics include characteristics relating to calibration and alignment.

12. The method of claim 10, wherein the characteristics include characteristics relating to imaged objects in motion.

* * * * *